VAPOR DEPOSITION OF SILICON-NITROGEN INSULATING COATINGS

Filed Jan. 19, 1967 3 Sheets-Sheet 1

Inventor:
JOSEPH H. SCOTT, JR.
BY Abraham Sherman
Attorney

Inventor:
JOSEPH H. SCOTT, JR.
BY Abraham Sherman
Attorney

Oct. 14, 1969 J. H. SCOTT, JR 3,472,689

VAPOR DEPOSITION OF SILICON-NITROGEN INSULATING COATINGS

Filed Jan. 19, 1967 3 Sheets-Sheet 3

Inventor:

JOSEPH H. SCOTT, JR.

BY Abraham Sherman

Attorney 3,472,689
Patented Oct. 14, 1969

3,472,689

VAPOR DEPOSITION OF SILICON-NITROGEN INSULATING COATINGS

Joseph H. Scott, Jr., Newark, N.J., assignor to RCA Corporation, a corporation of Delaware Filed Jan. 19, 1967, Ser. No. 610,447
Int. Cl. B44d *1/18*; H01l *3/00*
U.S. Cl. 117—212 3 Claims

ABSTRACT OF THE DISCLOSURE

A fast-etching coating consisting essentially of silicon and nitrogen is vapor deposited on a substrate, then converted to a slow-etching form.

BACKGROUND OF THE INVENTION

Field of the invention

This invention relates to improved methods of fabricating semiconductor devices by depositing insulating coatings from the vapor phase on appropriate substrates, and more particularly to the vapor deposition of an insulating coating consisting essentially of silicon and nitrogen.

Description of the prior art

Thin films or layers of insulating material have been extensively used on the surface of crystalliane semi-conductive bodies to control the diffusion of a conductivity modifier into predetermined portions of the body; to protect the surface intercept of a PN junction within the semiconductive body; to serve as the dielectric in a capacitor; and to insulate electrically conductive paths and leads on the body surface. Preferably, the coating is made of refractory material, so that it is not injured by the high temperatures utilized in the fabrication of semiconductor devices. One insulating material used hitherto has been silicon dioxide, or a mixture of silicon dioxide and silicon monoxide.

It is known that insulating coatings can be deposited on substrates by heating the substrates in the mixed vapors of silane and ammonia maintained at temperatures of about 750° C. to 1100° C. See, for example, Electronics, Jan. 10, 1966, page 164, wherein it was reported that at 800° the coating was deposited at the rate of 30 angstroms per minute, and the hotter the substrate, the faster the deposition rate of the coating. The insulating coating thus deposited is believed to consist essentially of silicon nitride, $Si_3N_4$, formed by the reaction $$3SiH_4+4NH_3 \rightarrow Si_3N_4\downarrow+12H_2\uparrow$$

In many applications it is desirable to have an insulating coating on predetermined portions only of a substrate surface. For example, when it is desired to utilize an insulating coating as a diffusion mask on the surface of a semiconductive body, it is common practice to deposit the coating over the entire surface of the semiconductive body, and then remove the undesired portions of the coating by standard photolithographic masking and etching techniques. However, the conventional silicon nitride coatings fabricated as described above are very difficult to etch. The etching rate of such silicon nitride coatings is too slow for convenient application in semiconductor device fabrication.

Accordingly, it is an object of this invention to provide an improved method of depositing on a substrate a fast-etching insulating coating consisting essentially of silicon and nitrogen.

Another object is to provide an improved method of depositing on a substrate an improved fast-etching insulating coating which can be subsequently converted to a slow-etching form.

SUMMARY OF THE INVENTION

An insulating coating consisting essentially of silicon and nitrogen is deposited on a substrate from the vapor phase while maintaining the substrate at a temperature below 725° C., so that the coating has a fast etching rate. According to one embodiment, a portion of the fast-etching coating thus deposited is removed. The remaining portion of the coating is then converted to a slow-etching form by heating the coated substrate to a temperature of about 900° C. to 1300° C.

DESCRIPTION OF THE PREFERRED EMBODIMENTS

Example I

Figures 1, 2:
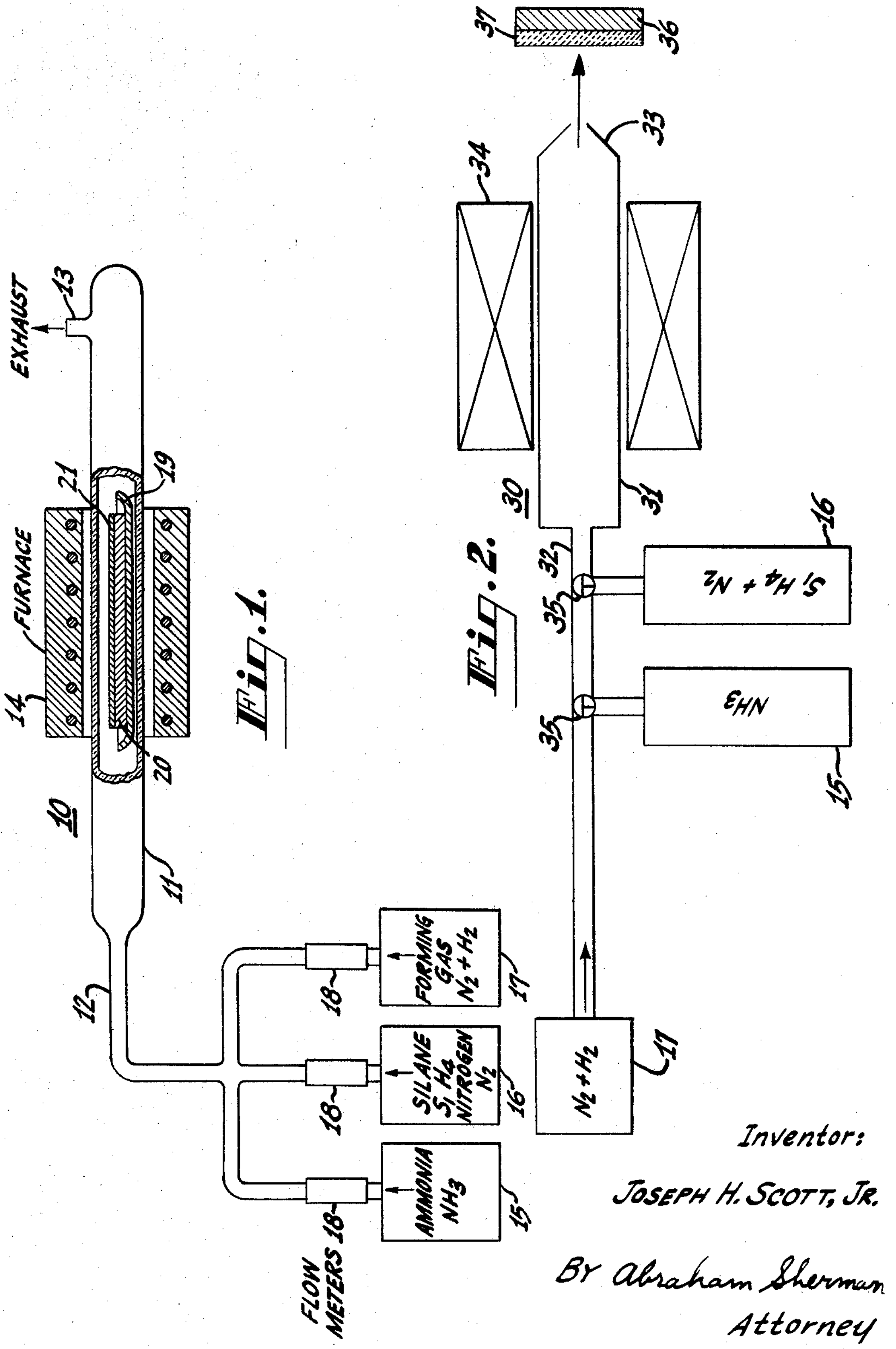
FIGURE 1 is a schematic sectional view of a first form of apparatus useful in the practice of the invention.
FIGURE 2 is a schematic sectional view of a second form of apparatus useful in the practice of the invention.

One form of apparatus 10 useful in the practice of the invention is illustrated in FIGURE 1. The apparatus 10 comprises a refractory furnace tube 11, which may, for example, consist of a high melting glass, fused silica, or the like. Furnace tube 11 is provided with an inlet 12 at one end, and an outlet 13 at the other end. The furnace tube 11 is positioned with its central portion in a furnace 14, which may, for example, be an electrical resistance furnace. An ammonia tank 15, a silane tank 16, and a tank of forming gas 17, all are arranged to feed into the inlet 12 of furnace tube 11. It has been found preferable to utilize the silane in the form of a diluted mixture consisting of about 1 to 10 volume percent silane, the balance an inert gas such as nitrogen or argon. The flow of gas from each tank is regulated by three flow meters 18 between each tank and the inlet 12.

A refractory furnace boat 19 is positioned within that portion of the furnace tube 11 which is surrounded by the furnace 14. A substrate 20 which is to be coated is placed in the furnace boat 19. The substrate 20 may consist of an insulator such as alumina or the like; a semiconductor such as silicon or gallium arsenide or the like; or a metallic body.

The furnace 14 is set to maintain the temperature inside furnace tube 11 at about 575° to 700° C. The inert carrier gas utilized, which in this embodiment is a nitrogen-hydrogen mixture known as forming gas, is first swept through the furnace tube while the furnace 14 is warmed to the desired temperature. The rates of flow of the various reactants described below is but exemplary, and may be varied depending on the size and shape of the apparatus and the temperature of the furnace.

In this example, the forming gas is passed through the system at the rate of about two cubic feet per hour while the furnace 14 is warmed to the desired temperature. When the temperature inside furnace tube 11 has reached a predetermined level within the range of 575° to 700° C., a mixture of the ammonia from tank 15 and the diluted silane from tank 16 are swept through the inlet 12 into the furnace tube 11, where they react. An insulating and refractory coating 21 is thus deposited on the substrate.

The carrier gas, any unreacted silane and ammonia, and the reaction products leave the system by way of the outlet 13. After the insulating coating 21 has been deposited on the substrate 20 for the desired period of time, usually of the order of minutes, the flow of the ammonia and the silane mixture is shut off, and the furnace 14 is switched off. When the temperature inside the furnace tube 11 has dropped to about 200° C., the flow of the carrier gas may be turned off completely, and the furnace boat 19 together with the coated substrate 20 may be removed from the furnace tube 11.

The precise nature of the insulating coating 21 thus formed is not certain, although it is known to consist essentially of silicon and nitrogen. The coating 21 thus formed differs from the conventional silicon nitride coating, which is deposited at temperatures above 750° C., in three important respects. First, the coating 21 has a dielectric constant of about 6, whereas the silicon nitride coatings deposited at temperatures above 750° C. have a dielectric constant of about 10. Second, the thermal coefficient of expansion of the insulating coating 21 thus deposited does not match the thermal coefficient of expansion of silicon, whereas the insulating coatings deposited at temperatures above 750° C. have a thermal coefficient of expansion which is very close to that of silicon. Third, the insulating coating 21 can be readily etched, which is useful for semiconductor device fabrication. In contrast, the prior art silicon nitride coatings deposited at temperatures above 750° C. can be etched only slowly and with difficulty. For these three reasons, it is believed that the coating deposited according to the invention, which appears to be deficient in nitrogen, probably has a composition approaching SiN, whereas the slow etching silicon nitride coatings deposited at temperatures above 750° C. have the composition $Si_3N_4$. Experiments have indicated that the etching rate of the coatings thus deposited, when measured with a standard etchant such as an aqueous ammonium fluoride-hydrogen fluoride solution, varies continuously and inversely with the deposition temperature within wide limitations, thus indicating that the composition of the insulating coating changes as the deposition temperature changes. Moreover, the rate of deposition of the coatings also affects the etching rate of the coatings, since those coatings which are deposited rapidly etch rapidly, while those which are deposited slowly etch slowly.

Example II

In this method, the silane and ammonia react in a hot furnace tube as in the method described above, but the substrate to be coated is not present in the furnace tube. Instead, the substrate is kept in a cooler environment completely outside the furnace tube. The reacting gases are swept out of the furnace tube, and are rapidly cooled by forcing them through a jet so as to impinge upon the substrate, and thus form on the substrate an insulating coating consisting essentially of silicon and nitrogen. The special utility of this method is that only moderate heating of the substrate is required.

A form of apparatus 30 (FIGURE 2) useful in this embodiment comprises a refractory furnace tube 31 having an inlet tube 32 at one end, and jet orifice 33 at the other end. Furnace tube 31 is positioned in a furnace 34. An ammonia tank 15, a silane-nitrogen tank 16, and a carrier gas tank 17 feed into the inlet tube 32. The flow of gas from tanks 15–17 is controlled by stopcocks 35 and 35'. As in the previous example, the carrier gas utilized is preferably a mixture of about 9 volumes nitrogen and one volume hydrogen.

In this embodiment, the substrate 36 on which the insulating coating is to be deposited is kept out of the furnace tube 31 and the furnace 34. Instead, a substrate 36 in this example is positioned a short distance, generally less than two inches, from the jet orifice 33. The system is purged by a flow of the carrier gas in the direction indicated by the arrows while the furnace is brought to a predetermined temperature in the range of about 575° to 1200° C. The stopcocks 35 and 35' are then opened, permitting a flow of silane and ammonia into the furnace tube 31. The temperature of the furnace tube 31 is now sufficient to insure reaction between the ammonia and the silane. The mixed vapors of the inert carrier gas, the unreacted ammonia and the silane, and the reaction products of ammonia and silane exit from the furnace tube 31 by way of the jet orifice 33. The mixed gases thus form a jet stream indicated by the arrow, and this jet stream is allowed to impinge upon the surface of the substrate 36. The jet stream cools off rapidly as it leaves the jet orifice 33, and hence the temperature of the jet stream at the point where it impinges upon the substrate 36 may be varied by adjusting the distance between the jet orifice 33 and the substrate 36. For a furnace temperature of about 700° C., and a separation between jet orifice 33 and substrate 36 of about 2 millimeters, the temperature of the jet impinging upon the substrate 36 is about 150° C. An insulating coating 37 consisting essentially of silicon and nitrogen is thus deposited on the substrate 36 while maintaining the substrate at a very moderate temperature. This method is particularly useful when the substrate is a low energy gap semiconductor such as one of the III–V compound semiconductors, which cannot withstand high temperatures.

Example III

Figure 3A:
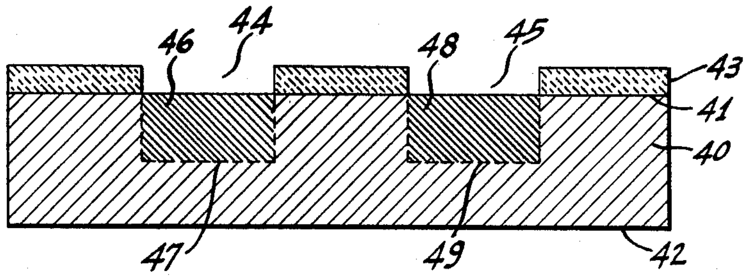
FIGURES 3*a*–3*c* are cross-sectional views of a semiconductive body during successive steps in the fabrication of a semiconductive device according to one embodiment of the invention; and, FIGURES 4*a*–4*d* are cross-sectional views of a semiconductive body during successive steps in the fabrication of a semiconductive device according to another embodiment of the invention.

A crystalline semiconductive body 40 (FIGURE 3*a*) is prepared with at least one major face 41. The precise size, shape, composition, and conductivity of semiconductive body 40 is not critical. Conveniently, the semiconductive body or substrate 40 is a die having two parallel opposing major faces 41 and 42. In this example, the semiconductive body 40 is about 50 mils square, about 6 mils thick, consists of monocrystalline silicon, and is of P type conductivity. The resistivity of semiconductive body 40 is preferably equal to or greater than 1 ohm-cm. The semiconductive body 40 is treated either as described in Example I or as described in Example II to deposit on face 41 an insulating fast-etching coating 43 which consists of the reaction product of silane and ammonia. Standard photolithographic techniques are utilized to form two spaced openings or apertures 44 and 45 in insulating coating 43. The semiconductive body 40 is now treated in the vapors of a conductivity modifier, which in this example is a donor such as arsenic, phosphorus, or the like to form two spaced low resistivity N type regions 46 and 48 in the semiconductive body 40 immediately adjacent apertures 44 and 45 respectively. Heavily doped low resistivity N type regions are hereinafter designated $N^+$ regions, while heavily doped low resistivity P type regions are designated $P^+$ regions. To insure low resistivity in regions 46 and 48, the diffusion is accomplished under such conditions of source concentration and heating profile that the concentration of charge carriers (electrons in this example) at the surface of regions 46 and 48 is at least $10^{19}$ cm.$^3$. The remaining portions of the silicon nitride layer 43 act as a mask against diffusion of the donor. PN junctions 47 and 49 are formed at the boundary between the $N^+$ type diffused regions 46 and 48 respectively and the P type bulk of the semiconductive body 40. The two $N^+$ regions 46 and 48 will correspond in size and shape to the two apertures 44 and 45 respectively. Preferably, the space between regions 46 and 48 should be less than one mil. In this example, the two donor-diffused low resistivity regions 46 and 48 are 10 mils long, 3 mils wide, and 0.1 mil thick. The two regions 46 and 48 are separated along their 10 mil length by a gap or space of about 0.2 mils.

Figure 3B:
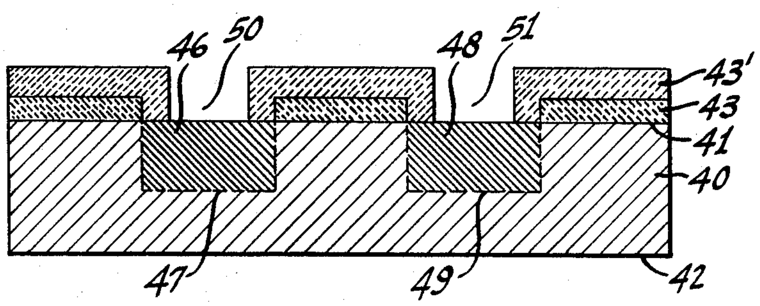

A second insulating layer 43' (FIGURE 3*b*) is deposited over the remaining portions of the first insulating layer 43 and over the exposed portions of face 41. The second insulating layer 43' is vapor deposited in the same manner as the first layer 43, and similarly consists of the fast-etching reaction product of silane and ammonia. Predetermined portions of the insulating layers 43 and 43' are now removed by any convenient method. For example, part of the surface of insulating layer 43' may be masked by coating it with an acid resist, and the unmasked portions then removed with an acid etchant such as an aqueous hydrofluoric acid solution. One opening 50 is thus formed entirely within one low resistivity region 46, and another opening 51 is formed entirely within the other low resistivity region 48.

Figure 3C:
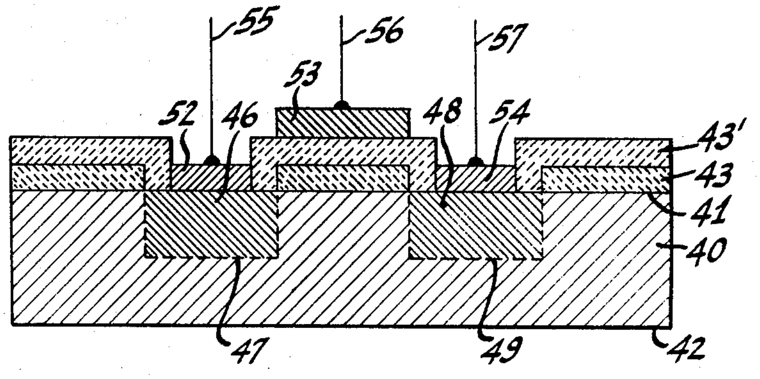

A metal such as aluminum, palladium, chromium, or the like is deposited by any convenient method, for example by evaporation through a mask, on the exposed portions of $N^+$ regions 46 and 48, and also on a portion of the insulating coating 43' over the gap or space between regions 46 and 48. One metallic contact 52 (FIGURE 3*c*) is thus formed to region 46, another metallic contact 54 to region 48, and a third metallic contact 53 on the uppermost silicon nitride layer 43' over the gap between regions 46 and 48. In operation, contacts 52 and 54 serve as the source and drain electrodes, while contact 53 serves as the control or gate electrode of the device. Electrical leads 55, 56 and 57 are attached to electrodes 52, 53 and 54 respectively. The unit may be encapsulated and cased by standard methods known to the semiconductor art. The device of this example may be operated as an enhancement type insulated-gate field-effect transistor as described in Wallmark and Johnson, "Field-Effect Transistors," Prentice-Hall, Inc., Englewood Cliffs, N.J., 1966.

Example IV

Figure 4A:
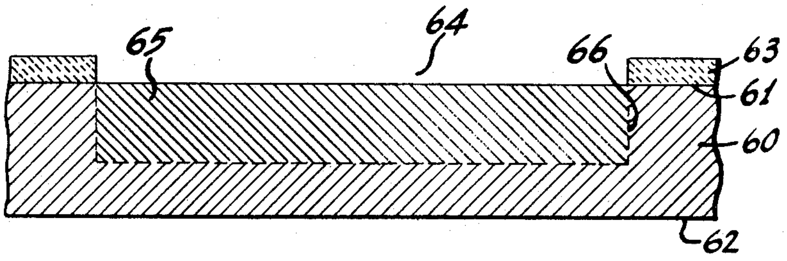

A body of given conductivity type crystalline semiconductive material such as an ingot slice 60 is prepared with two parallel opposing major faces 61 and 62, as illustrated in FIGURE 4*a*. In this embodiment, slice 60 consists of monocrystalline silicon doped with sufficient antimony so as to be of N type conductivity and have a resistivity of about 2 to 4 ohm-cm. Slice 60 is conveniently about 8 to 15 mils thick, and is large enough to make several hundred devices. In FIGURE 4 only a portion of slice 60 large enough to fabricate a single device is shown. A fast-etching insulating layer 63 consisting of the reaction product of silane and ammonia is deposited on one major face 61 by the method described in Example II above.

The insulating layer 63 is covered with a suitable resist (not shown), such as a photoresist. Standard photolithographic masking and etching techniques are used to remove a portion of insulating layer 63 and thus form a base window or aperture 64 in layer 63. A predetermined area of major face 61 is thus exposed. Slice 60 is treated in an ambient containing a boron compound so as to diffuse boron into that portion only of face 61 which is exposed by the window 64. A boron-diffused P type region 65 immediately adjacent the aperture 64 is thus formed. The insulating layer or coating 63 acts as a mask against the diffusion of boron, and prevents the diffusion of boron into that portion of face 61 which is beneath the remaining portions of the insulating coating 63. A rectifying barrier or PN junction 66 is formed at the boundary between the P type boron-diffused region 65 and the N type bulk of slice 60.

Figure 4B:
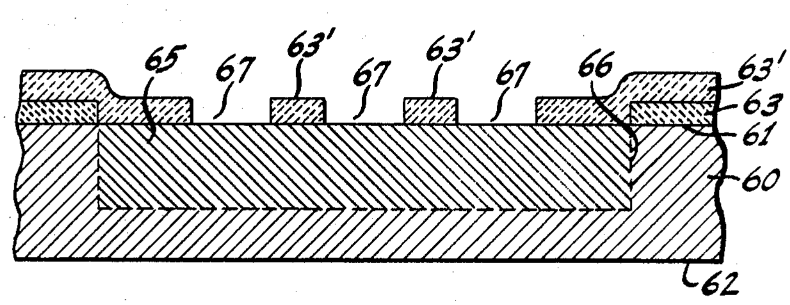
Figure 4C:
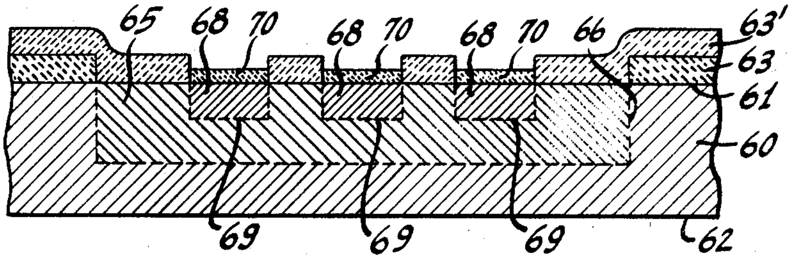
Figure 4D:
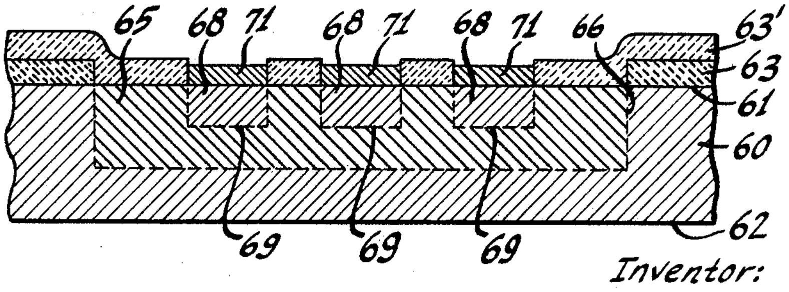

Slice 60 is now treated as described in either Example I or Example II above to deposit a second insulating coating 63' consisting essentially of silicon and nitrogen over the exposed portion of face 61, and over the remaining portions of insulating layer 63, as illustrated in FIGURE 4*b*. Standard photolithographic masking and etching techniques are employed to form a plurality of emitter windows 67 in the coating 63'. All of the windows 67 expose surface portions of the P type diffused region 65. For greater clarity only three such emitter windows 67 are shown in the drawing, but it will be understood that in practice there may be over a hundred such emitter windows 67. The exact size and shape of the emitter windows 67 is not critical. They may for example be square in shape, and have an edge less than 0.1 mils long.

The slice 60 is now heated to about 1000° C. in a non-oxidizing ambient such as hydrogen or forming gas. This heating step converts the coatings 63 and 63' from their original fast-etching form to a slow-etching form. For example, a fast-etching coating of silicon and nitrogen deposited on a substrate as described above in Example I had an etching rate of about 200 angstroms per minute when treated with a standard etchant at room temperature. After the coating was heated to 1000° C., the etching rate of the coating decreased more than an order of magnitude to 18 angstroms per minute.

The semiconductor body or slice 60 is now treated in the vapors of a donor such as phosphorus pentoxide to form a plurality of donor-diffused N type emitter regions 68 (FIGURE 4*c*) within the P type base region 65. Each N type region 68 conforms in size and shape and location to the corresponding emitter window 67. A PN junction 69 is formed at the interface between each N type emitter region 68 and the P type base region 65. During this diffusion step, a thin coating 70 of semiconductor oxide (silicon oxide in this example is formed on the exposed portions of major face 61.

The semiconductive body 60 is now treated in a standard etchant, such as a hydrofluoric acid solution, for a period of time (about 5 minutes in this example) which is sufficient to completely remove the oxide coating 70, but is insufficient to remove more than a very small portion of the coating 63', which has been converted to slow-etching form.

A metallic layer consisting of aluminum or chromium or the like is now deposited, for example by evaporation, over the exposed portions of face 61, and the undesired portions thereof removed by masking and etching, leaving a metallic contact 71 (FIGURE 4*d*) on each emitter region 68. A base contact (not shown) is also made by depositing a metallic film on a portion of face 61 internal base region 65 after removing appropriate portions of the coatings 63 and 63'. Since these coatings have been converted to the slow etching form, they are preferably removed by reverse sputtering or electron beam treatment. The remaining portions of the insulating layers or coatings 63 and 63' may be left on face 61 to protect the surface intercepts of the PN junctions formed in body 60. The subsequent steps of completing the device by dicing slice 60 into separate units, attaching electrical lead wires to the contacts of each unit, and casing each unit, are accomplished by standard methods known to the art.

One feature of the insulating coatings described is that they may be deposited on a substrate at temperatures as low as 575° C. by the method of Example I. When the method of Example II was utilized, deposition temperatures as low as 150° C. may be attained. These low deposition temperatures not only permit the use of low melting point substrates such as indium antimonide and the like, but also result in improved PN junction devices, since any conductivity modifier present in a semiconductive substrate is not diffused or otherwise affected by such low deposition temperatures.

Conventional silicon nitride coatings are etched so slowly by standard etchants that they are not convenient for semiconductive device fabrication. In contrast, the improved dielectric coatings can be readily etched at a rate fast enough for economical device fabrication. For example, a dielectric coating of $Si_3N_4$ deposited according to the prior art at a temperature of about 900° C. was found to have an etching rate of 20 angstroms per minute when treated with a standard ammonium fluoride-hydrofluoric acid etchant at room temperature. This etching rate is too slow for commercial device fabrication. In contrast, a dielectric coating consisting essentially of silicon and nitrogen deposited according to Example I at a temperature of about 650° C. was found to have an etching rate of 200 angstroms per minute at room temperature when treated with the same standard etchant. This etching rate is an order of magnitude faster than that of conventional $Si_3N_4$ coatings, and is sufficiently rapid for commercial device fabrication.

Another feature of the improved dielectric coating is that it serves as an excellent mask against the diffusion of conductivity modifiers. It has been found that the diffusion into semiconductive bodies of conductivity modifiers such as gallium and zinc, which is very difficult to prevent by conventional masking materials such as silicon oxide, is readily masked by the dielectric coatings according to the invention.

Moreover, the fast-etching coating can be converted to a slow-etching coating by simple heating of the coated substrate to a temperature of about 900° to 1300° C. Thus portions of the fast-etching coating can be removed by standard photolithographic techniques, and the remainder converted by heat treatment to a coating which is more dense, more closely matches the thermal expansion coefficient of silicon, has improved masking power, has a lower etching rate, and has a higher dielectric constant and breakdown voltage than the fast-etching coating originally deposited. For example, a dielectric coating of silicon and nitrogen deposited on a silicon substrate according to Example I, and having an etching rate of 200 angstroms per minute, was subsequently heated to 900° C. The etching rate of the coating was reduced to 28 angstroms per minute. A similar coating heated to 1100° C. exhibited an etching rate of 13 angstroms per minute; and a coating heated to 1200° C exhibited an etching rate of 10 angstroms per minute.

While the Examples III and IV described above relate to the deposition of insulating coatings on semiconductive bodies, the improved method may also be applied to the deposition of insulating coatings on other substrates, such as metallic bodies, or on insulating bodies such as glasses, ceramics and refractory oxides. Insulating coatings have been deposited on metallic objects such as electron tube components, as described for example in U.S. Patent 2,540,623, issued Feb. 6, 1951, to H. B. Law. Dielectric coatings consisting of the reaction product of silane and ammonia may similarly be deposited according to the invention on metallic objects.

If desired, the apparatus described in Example I may be modified by using a two-zone furnace. The first portion of the furnace tube 11 adjacent the inlet 12 is maintained at a temperature of about 575° to 800° C. The silane and ammonia vapors mix and react in this portion of the furnace tube 11. The second portion of the furnace tube 11 adjacent the outlet 13 contains the furnace boat 19 and the substrate 20. This second portion of the furnace tube 11 is maintained at a lower temperature than the first portion. A clear glassy fast-etching film consisting essentially of silicon and nitrogen is thus deposited on the substrate. A conductivity modifier may be incorporated in all the vapor deposited dielectric coatings described by the addition to the reactants of up to about one volume percent of the vapors of a volatile compound such as diborane or phosphine.

When the substrate consists of a material which is markedly different from silicon nitride, the abrupt discontinuity between the substrate and the silicon nitride coating may be modified by first depositing on the substrate a thin film of silicon, and then depositing the dielectric silicon nitride coatings on the silicon film.

In both the method of Example I and the method of Example II, it is preferred that the combined total pressure of the vapors of silane and ammonia be less than one atmosphere.

I claim:

1. The method of depositing on a substrate an insulating coating consisting essentially of silicon and nitrogen, comprising:

heating said substrate in the mixed vapors of silane and ammonia at a temperature of 575° C. to 700° C. to form a fast-etching coating consisting essentially of silicon and nitrogen on said substrate;

removing predetermined portions of said fast-etching coating by etching; and, heating said substrate and coating to a temperature of 900° to 1300° C. to convert the remaining portions of said coating to a slow-etching form.

2. The method as in claim 1, wherein said substrate is a body of crystalline semiconductive material.

3. The method as in claim 2, wherein said vapors of silane and ammonia are at a combined total pressure of less than one atmosphere.

References Cited

UNITED STATES PATENTS

| | | | |
|---|---|---|---|
| 3,170,273 | 2/1965 | Walsh | 51—281 |
| 3,200,015 | 8/1965 | Kuntz | 117—106 X |
| 3,226,194 | 12/1965 | Kuntz | 117—106 X |
| 3,328,214 | 6/1967 | Hugle | 148—175 |

FOREIGN PATENTS

| | | |
|---|---|---|
| 1,190,308 | 10/1959 | France. |

OTHER REFERENCES

English translation of French Patent 1,190,308, 8 pages.

ANDREW G. GOLIAN, Primary Examiner

U.S. Cl. X.R.

117—62, 106; 148—175; 156—17